Inventor
D. M. DeLong

Patented May 9, 1939

2,157,953

UNITED STATES PATENT OFFICE 2,157,953

INSECT DESTROYER

Dwight M. De Long, Upper Arlington, Ohio, assignor of one-half to Theodore T. Haack, Columbus, Ohio Application June 10, 1938, Serial No. 213,051

4 Claims. (Cl. 43—131)

This invention relates to an insect destroyer or a bait container and more particularly to a device for retaining moisture in insect bait by maintaining the original vapor pressure in the device to prevent rapid deterioration of the bait, the device being especially adapted for keeping ant or insect bait moist which is essential if it is to be effective with ants and similar insects as the latter will not be attracted thereto unless in a moist state. The primary object of this invention is the provision of an inexpensive airtight container having an entrance sealed prior to use and in which ant or insect poisonous bait is placed along with a moistening medium for keeping the bait in proper moist condition for an indefinite period of time and when said device is placed in use by opening the entrance the bait will be kept in a moist and attractive condition by the moistening medium so that ants, insects and the like will be readily attracted to the bait, the bait remaining in this condition until entirely consumed by the ants or insects.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a top plan view, partly broken away, illustrating an insect destroyer constructed in accordance with my invention.

Figure 1:
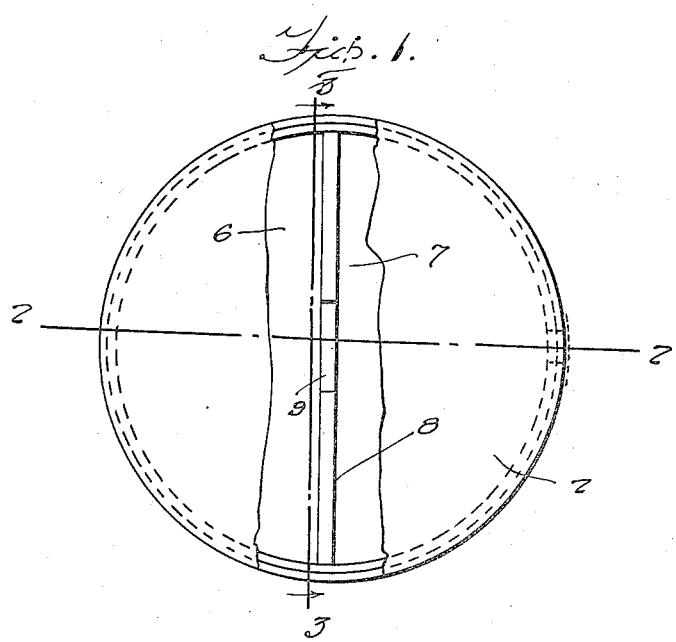
Figure 2:
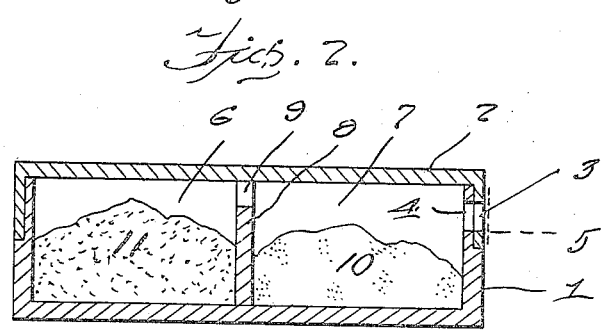
Figure 2 is a sectional view taken on line 2—2 of Figure 1.
Figure 3:
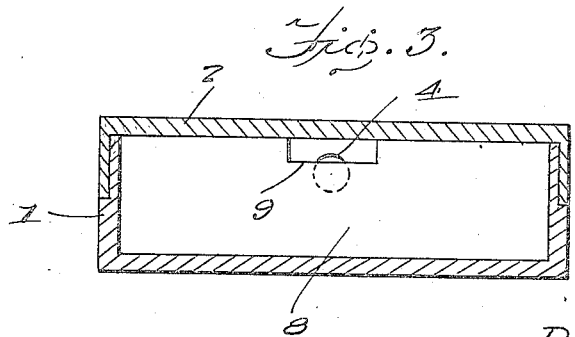
Figure 3 is a sectional view taken on line 3—3 of Figure 1.

Referring in detail to the drawing, the numeral 1 indicates a container having a cover 2 of the flanged type to fit tightly onto the wall of the container for the purpose of rendering the latter airtight. The cover 2 in the flange thereof is provided with an opening 3 aligning with an opening 4 in the wall of the container, which openings cooperate in forming an entrance to the interior of the container. A destructible sealing medium 5 is secured on the cover over the opening 3 thereof for sealing or closing the entrance and which may be easily and quickly destroyed when placing the device in use.

Any number of compartments may be provided in the container. In the present showing compartments 6 and 7 are divided by a partition 8 which extends from the cover to the bottom of the container and has a slot 9 placing the compartments in communication with each other. The compartment 7 has arranged therein a poisonous insect bait 10 while the compartment 6 has arranged therein a moisture furnishing medium 11. The poisonous bait 10 may consist of any chemical or mixture that is destructive to insects and may be mixed with sugar or other attractant. The moistening medium 11 is a saturated salt solution in cotton or other material or in paste form. With the cover placed on the container to render the same air-tight, the entrance also being sealed, there can be no loss of moisture.

Since different saturated salt solutions have different vapor pressures, a saturated salt solution is selected that has a vapor pressure of approximately that of the vapor pressure of the bait. Therefore, the vapor pressure in the compartment 7 is the same as the vapor pressure in the compartment 6. In other words, the vapor pressure in both compartments is balanced. As long as there is no loss of moisture from the container by evaporation or diffusion this balance is not disturbed and there is no transfer of vapor from one compartment to another.

When the device is placed in use, the seal of the entrance is broken to give the ants or insects access to the bait. As soon as this is done the moisture in the bait or compartment 7 starts to diffuse through the entrance and evaporate. As moisture is thus lost from the bait compartment by evaporation, the vapor pressure in that compartment is lowered and the balance between the vapor pressures in the two compartments is disturbed. The vapor pressure from the salt solution which is now greater than the vapor pressure from the bait flows into the bait compartment until the vapor pressures in both compartments are equal again or in balance. By this transfer of vapor from the salt solution to the bait in the compartment 7 vapor pressure in the salt solution compartment is lowered. Now the principle—that a saturated solution has a definite vapor pressure which remains constant as long as any salt solution remains becomes operative. To keep the vapor pressure in the salt solution or the moistening compartment 6 constant, the concentrated salt solution releases enough of its moisture to replace the moisture lost by diffusion through the entrance. In this way the moisture that is lost from the container is actually taken from the concentrated salt solution and not from the bait. This action continues until all the moisture from the salt solution has escaped the device.

As long as the vapor pressure in the bait compartment is kept normal, and this is done automatically by the salt solution replacing any moisture lost by diffusion, the bait does not dry out and become useless. The length of time that this action depends upon is the amount of salt solution placed in the compartment 6, the rate of evaporation which varies with different temperatures and exposures, and upon the size and number of openings or entrances. Under conditions in which ant or insect baits are normally used, this principle will make an ant or insect bait effective much longer than is necessary for their eradication.

The same principle applies, and the bait is just as effective, when the partition 8 is omitted if the poison bait and saturated salt solution or composition are supplied in a semi-solid or paste form and placed in one chamber of the container.

It is well known that ants, with few exceptions, will not feed on dry bait and normally moist baits rapidly dry or lose their moisture when exposed to the atmosphere which renders them ineffective. Therefore, through the use of the present invention the bait may be kept in an attractive condition for an indefinite period prior to use and when placed in use will remain in its attractive condition until practically all of it is consumed or until the moistening medium has become expended.

It is believed that the foregoing description when taken in connection with the drawing will fully set forth the construction and advantages of this invention to those skilled in the art to which such device relates, so that further detailed description will not be required.

Having thus described my invention, what I claim is:

1. An insect destroyer comprising an airtight container provided with an entrance and having communicating compartments, a seal for said entrance, a moist poisonous bait arranged in one of the compartments, and a moistening medium arranged in the other compartment for keeping the bait moist after the removal of the seal and the bait open to the atmosphere by way of the entrance and for consumption by insects.

2. An insect destroyer comprising an airtight container provided with separable compartments in communication with each other and an entrance in communication with one of the compartments, a destructible seal closing said entrance, a moist poison bait arranged in the last-named compartment, and a moistening medium located in the other compartment for keeping the bait moist after the destruction of the seal and being in direct communication with the atmosphere and open for consumption by insects.

3. An insect destroyer comprising an airtight container having an entrance, a destructible seal closing said entrance, a partition in said container dividing the latter into separable compartments and having a slot for placing the compartments in communication with each other, a moist poisonous bait arranged in the compartment which is in direct communication with the entrance, and an absorbent material containing a salt solution arranged in the other compartment for keeping the bait moist after the seal is destroyed and the bait in communication with the atmosphere and open for consumption by insects.

4. An insect destroyer comprising an airtight container having communicating compartments and provided with an entrance, a seal for said entrance, a moist poisonous bait in one of the compartments, and a moistening medium in the other compartment having a vapor pressure approximately the same as the vapor pressure of the poisonous bait whereby the vapor pressures remain balanced as long as the container is sealed and only becomes unbalanced on the breaking of the seal and thereby keeps the bait moist after the destruction of said seal and the bait open to the atmosphere and consumption by insects.

DWIGHT M. DE LONG.